May 21, 1968     C. SCHNELL     3,384,139
COMMINUTING AND DEAERATING MACHINE
Filed Feb. 1, 1966     5 Sheets-Sheet 1
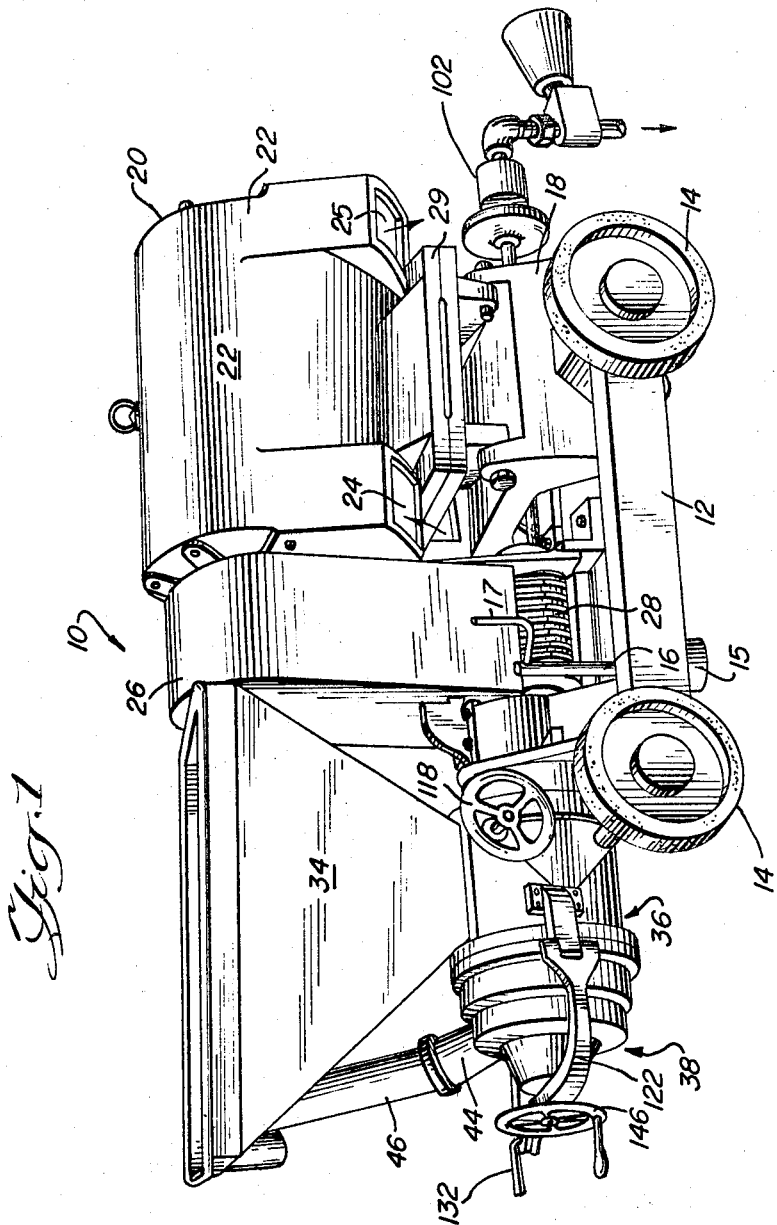
INVENTOR
Carl Schnell
BY
ATTORNEYS May 21, 1968  C. SCHNELL  3,384,139
COMMINUTING AND DEAERATING MACHINE
Filed Feb. 1, 1966  5 Sheets-Sheet 2
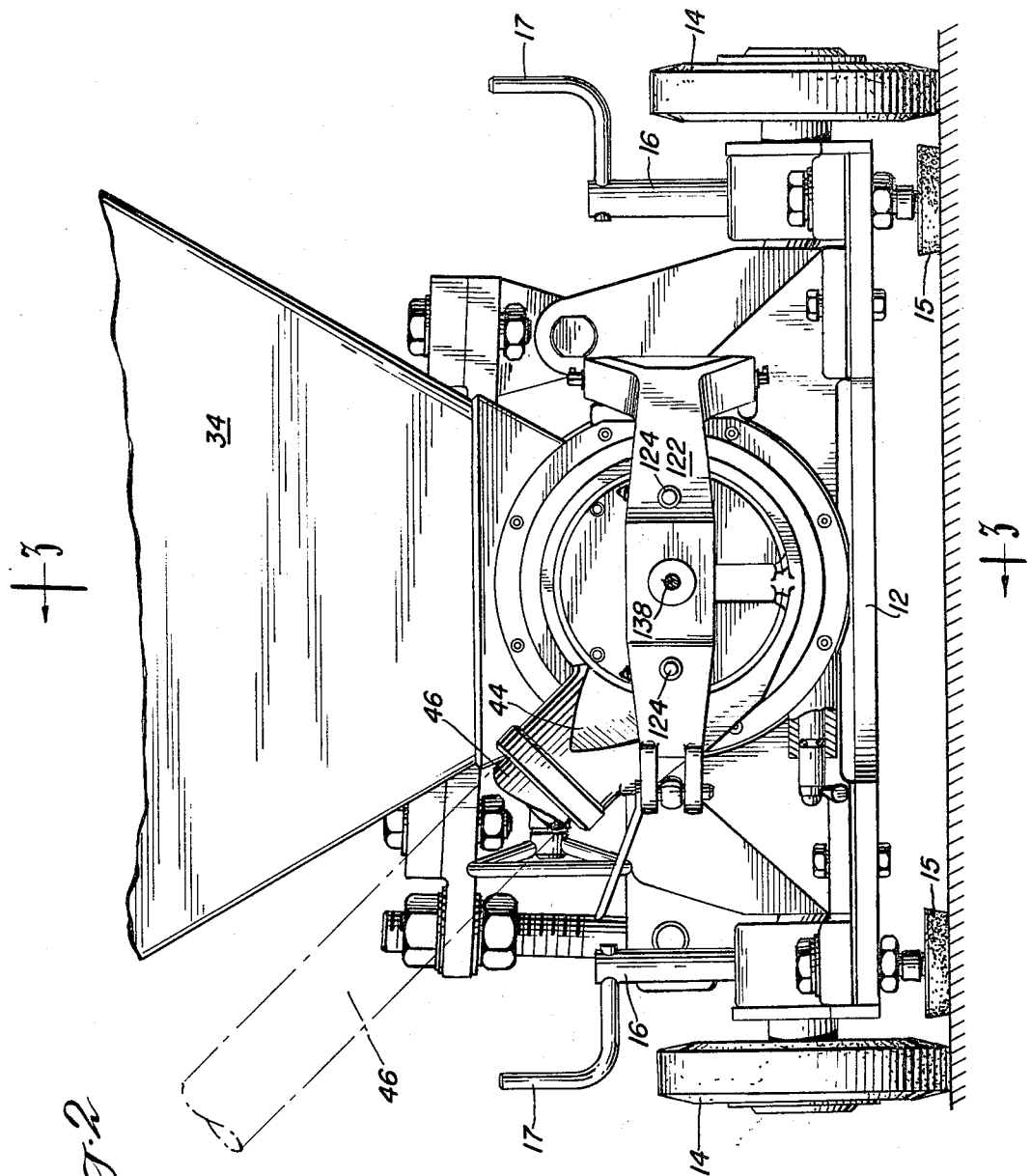
INVENTOR
Carl Schnell
BY Merriam, Marshall, Shapiro & Klose
ATTORNEYS

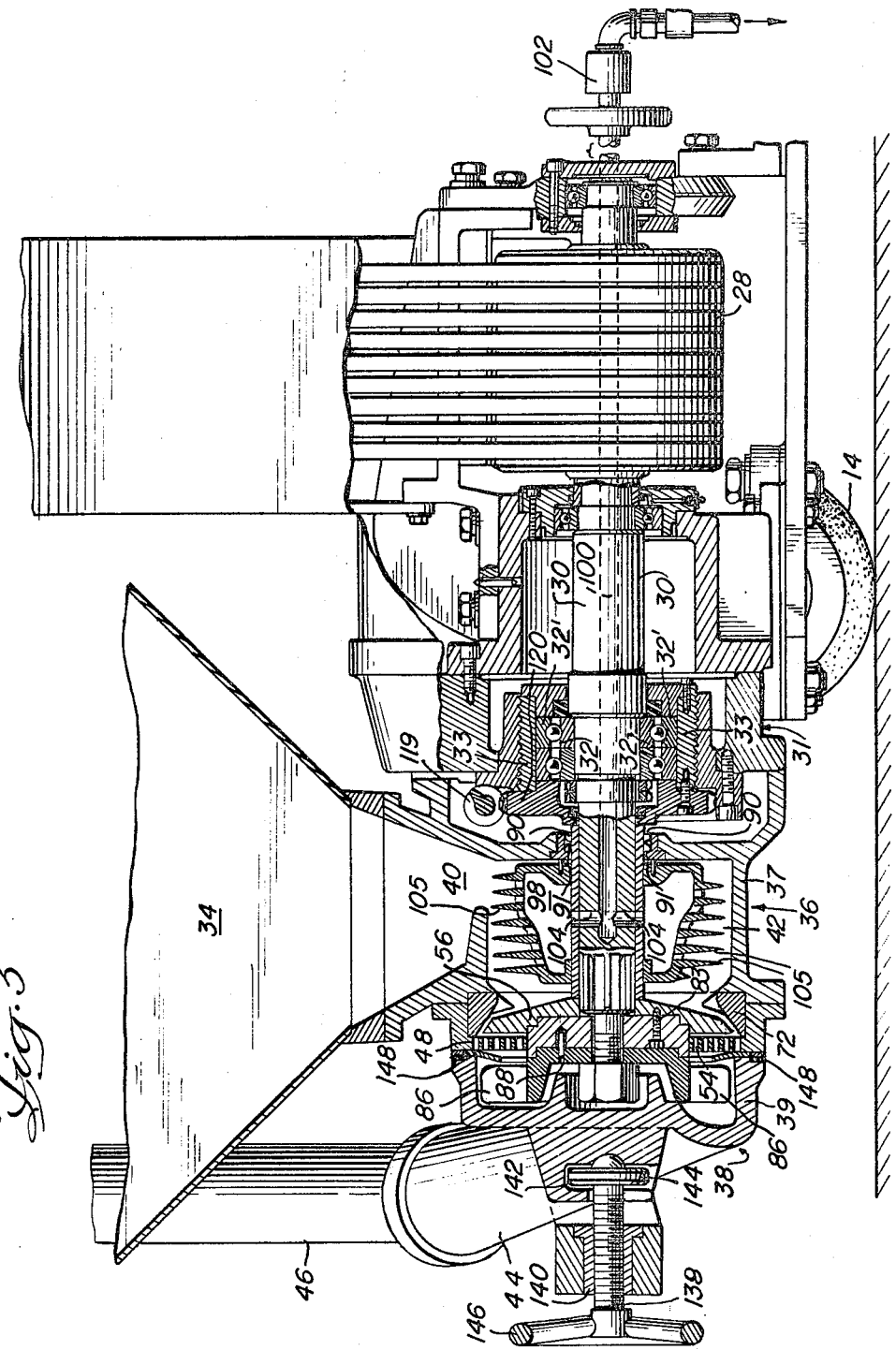

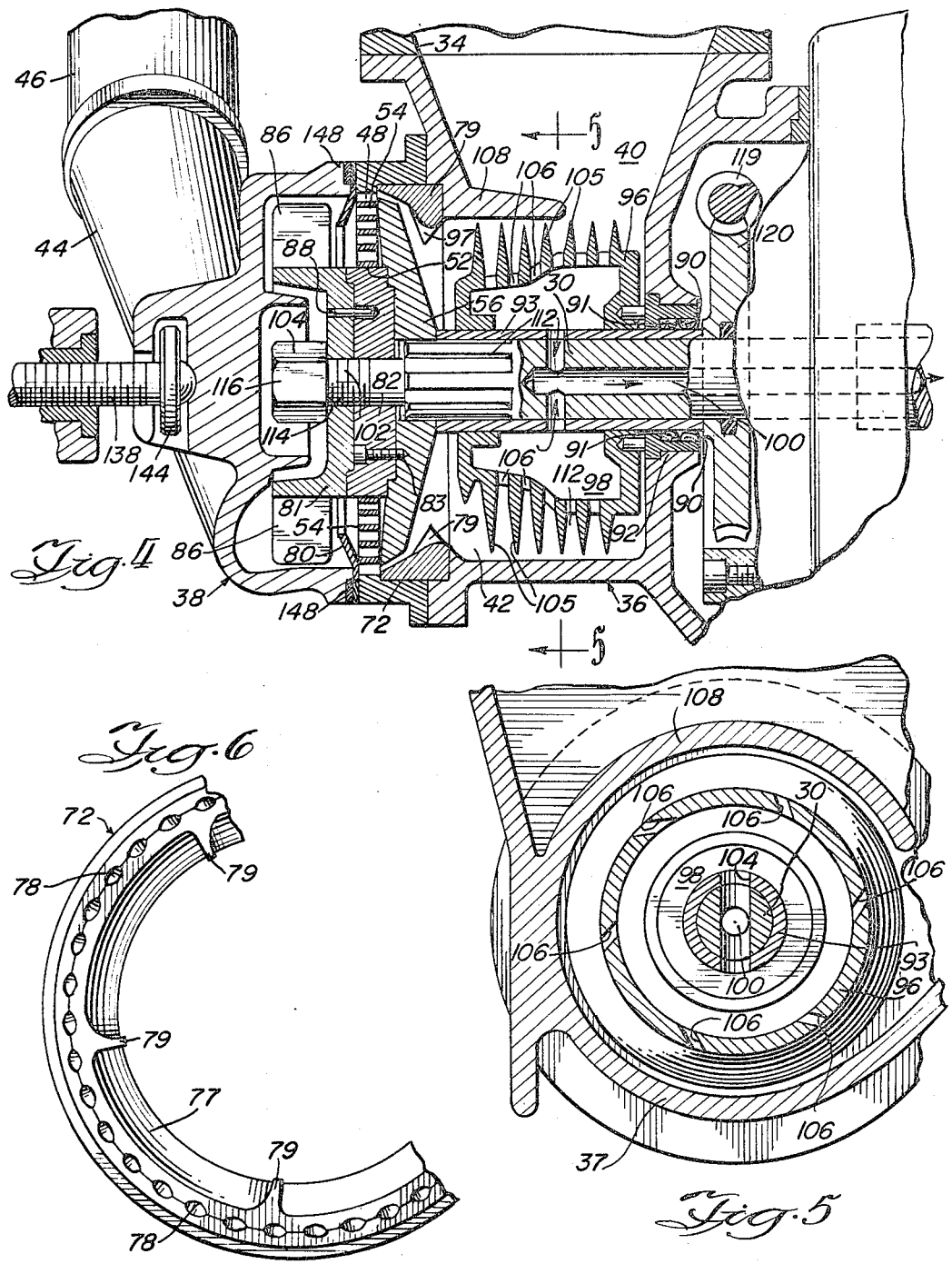

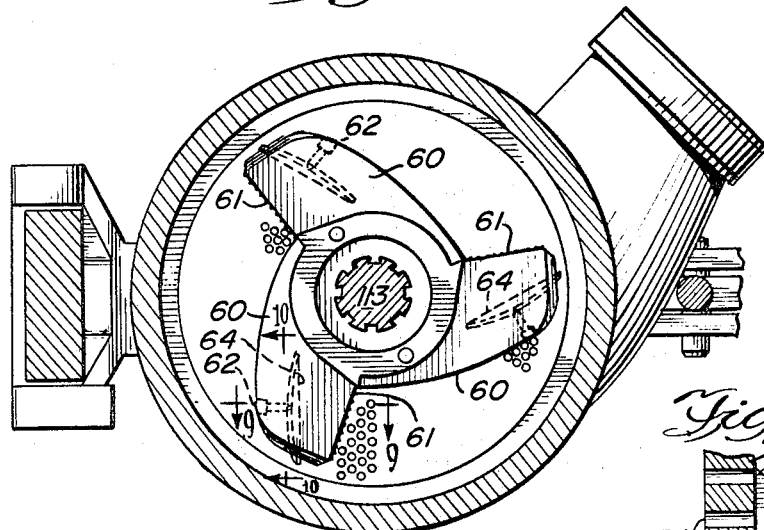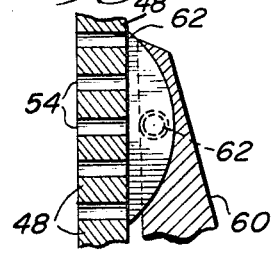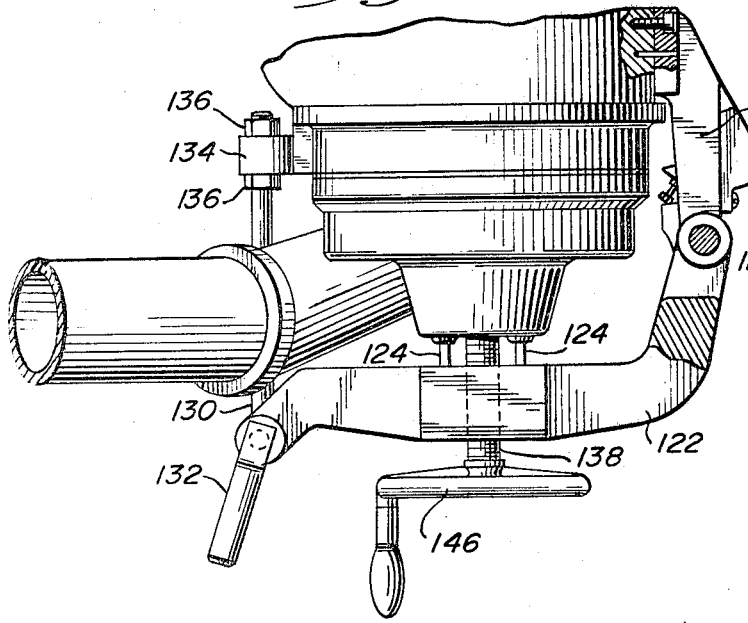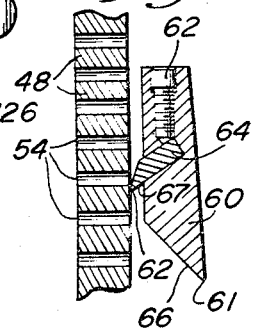

United States Patent Office 3,384,139
Patented May 21, 1968

3,384,139
COMMINUTING AND DEAERATING MACHINE
Carl Schnell, Winterbach, near Schorndorf-Wurttemberg, Germany, assignor of one-half to The Griffith Laboratories, Inc., Chicago, Ill., a corporation of Illinois
Filed Feb. 1, 1966, Ser. No. 524,010
Claims priority, application Germany, Aug. 7, 1965, Sch 37,519
4 Claims. (Cl. 146—182)

ABSTRACT OF THE DISCLOSURE

Continuous food comminuting and deaerating apparatus wherein upstream of a comminuting area which is sealed to prevent ingress air, is a rotating deaerating element with outwardly extending projections and openings between the projections through which a vacuum is drawn as the food material is directed radially outward by centrifugal force.

---

This invention relates to comminuting machine suitable for use in producing comminuted comestible products, especially agricultural and animal products including meat products used for making emulsions for sausages and the like.

In its more specific aspect, this invention relates to centrifugal, high-speed comminuting machines having improved conveyor and deaerating means resulting in an improved product.

In the processing of meat and agricultural products, some air commonly becomes mixed with or entrapped in these products during the treatment thereof. For example, in the preparing of meat products such as sausages, the meat may be initially cut in a preliminary cutter such as a silent cutter or grinder, then treated to form a superior emulsion in a high-speed centrifugal comminuting machine such as shown and described in U.S. Letters Patent No. 3,044,514, and then passed to a sausage stuffer that stuffs the comestible comminuted meat emulsion into flexible food casings.

During comminuting, some air becomes admixed with the meat product and entrapped therein, despite the fact that the above referred to high-speed centrifugal comminuting machine may be operated so that the product being treated therein is sealed from the ingress of air during the operation of the machine. Air entrapped in the comminuted meat product accelerates fermentation and induces disintegration of the meat product so that the storage life of the product is shortened. Also, the entrapped air, as a general rule, is not distributed uniformly throughout the product, and as a consequence, the density of the product is not uniform, thereby resulting in a weight variance in packaged products. Moreover, entrapped air contributes to waste bulk in the packaged product.

My invention has as its purpose to provide for a comminuting machine a vacuum means in communication with the comminuting means, whereby occluded or entrapped air is removed from the material undergoing comminution to deaerate the comminuted material.

In general, the comminuting machines of this invention comprise in communicating sequence a feed or reservoir chamber, a comminuting chamber and a discharge chamber (preferably having an ejector rotor), which chambers may be sealed against ingress of air during operation. The machine, when sealed during operation, is arranged to produce a continuous and moving hydraulic column of product (e.g., meat emulsion) free from ingress of air. As a result, the output of the machine is increased and an excessive temperature rise in the meat product is avoided.

A powered shaft means extending from a motor into the comminuting chamber drives at least one high speed propelling knife or cutting element in the comminuting chamber and, preferably a centrifugal ejector rotor in the discharge chamber. The shaft means desirably is sealably mounted during operation thereby preventing the ingress of air when the machine is comminuting comestible products (e.g., meat products). Where desired, the comminuting machines herein described may be constructed to provide either a single high-speed propelling knife and single perforate plate or a plurality of high-speed propelling knives operatively associated with their respective perforate plates. A comminuting machine that has a plurality of knives or cutting elements, however, generally produces a finer-textured product (e.g., meat product or meat emulsion).

The shaft means is provided with a longitudinal bore which extends to suction producing vacuum means. The bore opens to the comminuting chamber thereby establishing fluid communication between the comminuting chamber, the bore of the shaft, and the suction producing means. During operation of the machine, occluded air is drawn from the product undergoing comminution, and existing air is aspirated by suction-producing means via the bore of the shaft.

Reference is now had to the following detailed specification, and to the accompanying diagrammatic drawings in which my invention is illustrated.

In the drawings:

FIGURE 1 is a side perspective view of a comminuting machine embodying my invention;

FIGURE 2 is an end view of the machine of FIGURE 1;

FIGURE 3 is an enlarged sectional elevational view along the line 3—3 of FIGURE 2 showing part of the machine of FIGURE 1 in greater detail;

FIGURE 4 is an enlarged fragmentary sectional elevational view of the machine of FIGURE 1 showing in more detail certain components of the machine;

FIGURE 5 is an enlarged sectional view on line 5—5 of FIGURE 4;

FIGURE 6 is an enlarged fragmentary plan view of an annular lug ring;

FIGURE 7 is a plan view partly in section illustrating the mounting of the discharge chamber which enables it to be moved selectively away from and toward the comminuting chamber;

FIGURE 8 is a view of a portion of the comminuting chamber showing a high-speed propelling knife located in advance of a perforate plate (only a few of the holes are shown therein);

FIGURE 9 is an enlarged fragmentary cross-sectional view of knife means and perforate plate taken on line 9—9 of FIGURE 8; and FIGURE 10 is a cross-sectional view taken on line 10—10 of FIGURE 9.

Referring to the drawings wherein like reference numerals designate similar parts throughout, there is shown in FIGURE 1 a comminuting machine, designated in general by the reference numeral 10, suitable for comminuting comestible products and, for example, capable of producing a meat emulsion such as used for sausages. The comminuting machine is supported by a platform 12 having wheels 14 for moving the machine, and as shown in FIGURES 1 and 2, feet 15 which are connected to adjustable legs 16 having a hand crank 17 used for braking the machine.

A second smaller platform 18 is arranged to one side of platform 12 and is supported thereon by suitable means. An electric motor, designated generally by the numeral 20, is supported on platform 18 by suitable means, and includes a housing 22 having an air intake 24 and air outlet 25.

Suitable drive means including motor pulley 26 having a belt drive 28 is positioned adjacent motor 20. There is provided a movable motor platform 29 to allow for belt adjustment.

Drive shaft 30 extending from the drive means and being driven thereby extends through the bearing housing, indicated generally by the numeral 31, and extends into the comminuting section of the machine, to be described in greater detail hereinbelow. The bearing housing typically might be a double ball-bearing structure that has inner bearing race portions 32 clamped to the drive shaft 30 and outer bearing race portions 32′ clamped to the bearing cage 33 such as shown in FIGURE 3.

The comminuting machine illustrated herein is driven by the motor means through sealably mounted drive shaft 30. Wall means define in advancing and communicating sequence a frusto-conical reservoir or feeding hopper chamber 34, a comminuting chamber 36 in housing 37 and a discharge chamber 38 in housing 39. A machine having this arrangement of the various chambers provides during operation a continuous and moving hydraulic column of material undergoing comminution which is substantially free from ingress of air and extending from at least the entrance way of the comminuating chamber to the confines of the discharge chamber (i.e., to the discharge port 44).

The comestible material is fed through the upper opening of the reservoir 34 and passes downwardly in a converging direction. Where desired, the reservoir may be covered and the material forced fed by a suitable pump such as a positive displacement pump. The reservoir is mounted or supported along the bearing housing 31 which in turn is supported on platform 12 by suitable means. The comminuting chamber 36 is provided with a neck or throat portion 40 communicating diretly with the reservoir and a substantially horizontal portion 42. Positioned adjacent the comminuting chamber and communicating directly therewith is discharge chamber 38 disposed about its horizontal axis, and having an outlet means or discharge port 44 and a discharge nozzle or horn 46.

Referring more specifically to FIGURES 3 and 4, there is shown a vertically disposed perforate valve plate 48 mounted in a stationary position in the comminuting chamber 36 during operation. Plate 48, desirably made of metal, is provided with relatively large central opening 52 and a multiplicity of relative small holes or openings 54 throughout the annulus of the plate. The plate 48 is mounted in the interior wall of the comminuting machine and is held against rotation during operation of the machine by any suitable means such as a shear pin or set screw (not shown). The perforate valve plate 48 creates or produces back pressure upon the product in the comminuting chamber 36.

The comminuting machine as illustrated employs a high-speed propelling knife 56 positioned adjacent perforate valve plate 48 and in shearing relationship therewith. The high-speed propelling knife, as shown in FIGURES 8-10, is balanced for rotation in the comminuting chamber, and rotates at right angles to the axis of the drive shaft 30. The knife employed may be of the general type described in U.S. Patent No. 3,044,514. A knife of this type includes a knife mount or arms 60 having a leading cutting edge 61 and holds by means of set screw 62 a suitable blade 64 which provides a trailing cutting edge 65. An inclined propelling face 66 slopes from the leading edge toward the perforate plate and is positioned between the planes generated upon rotation of the leading and trailing cutting edges.

The inclined face of the knife mount acts as a propeller to urge material toward the perforate valve plate 48. The trailing or lower cutting edges provided by the blades 62 normally bear on the perforate valve plate and cut or shear material thereat. The knife arms are tapered outwardly, and this outward taper equalizes the work done along the length of the mounts. The taper thus provides hydrodynamic balance. The face of each knife has a changing and increasing degree of inclination relative to the axis of rotation as the face approaches the path of rotation of the trailing edge. This provides a pressure pocket 67 that extends forwardly in rotation of the trailing edge and extends along the length of that edge. The pressure pocket urges material that is difficult to cut into better cutting engagement with the trailing cutting edge of the knife and the small holes 54 in the perforate valve plate 48.

Annular lug ring 72 is fixedly mounted adjacent knife 56 in horizontal portion 42. As shown in FIGURE 6, annular lug ring 72 is provided with an inwardly sloping wall 77 scalloped at 78 to provide inwardly disposed cutting edges and a plurality of spaced lugs 79.

There is provided rearwardly of the knife 56 (upstream) in the comminuting chamber 36 obstructing means for directing circulation of material undergoing comminution toward the rotating knife 56 and perforate valve plate 48, and relieve or counteract back pressure exerted by the perforate plate. The obstructuring means include lug ring 72 and its respective elements, and/or restricted neck 40 of the comminuting chamber, and/or recirculating surfaces of the comminuting chamber. Thus, the obstructing means adjacent knife 56 includes inwardly sloping wall 77 of lug ring 72, spaced lugs 79, and the restricted neck portion 40.

A venturi ring or annular suction ring 80 directs comminuted material centrally and increases the velocity of material being fed to the ejector means such as the wings or blades 86 of ejector rotor 81 in the discharge chamber 38. This ring is shown and described in detail in my application Ser. No. 105,504, filed Apr. 25, 1961, issued as Patent No. 3,149,653.

Spacing disc 82 is arranged in opening 52 and is secured to the knife means of screw 83. The spacing disc is free to rotate upon rotate of the knife. Ejector rotor 81 having a plurality of wings 86 laterally disposed therefrom is mounted in the discharge chamber 38 at the end of drive shaft 30. The ejector rotor is in abutting engagement with the spacing disc by means of pins 88.

Drive shaft 30 extends from the motor pulley, through the bearing housing 31, and continues on through the wall of the neck portion 40 of the comminuting chamber 36 and terminates within the discharge chamber 38. Suitable sealing means 90 and 91 prevent the ingress of air to the comminuting machine. Such sealing means comprise air-sealing, circular spring-loaded seals, and the lips of the seals may be made from rubber, plastic, graphite, etc. Seals such as shown in FIGURE 9 of U.S. Patent No. 3,044,514 may be used. Sealing means 90 is mounted in bushing 92. Horizontal spacer 93 is mounted on drive shaft 30 and extends through the neck portion 40 of the comminuting chamber 36 and positions knife 56.

A vacuum rotor 96, having a cavity 98, is mounted on drive shaft 30 in the comminuting chamber. The drive shaft 30 is provided with a longitudinal bore 100 extending from vacuumizing pump 102 to the radial bore 104 which opens to the cavity 98. The vacuum rotor 96 is provided with a plurality of spaced, involute projections 105 having their radial surfaces inclined to nonparallel axes. The rotor 96 is tapered step-wise in a conveying or downstream direction, substantially as shown in FIGURE 4, and the projections are of sufficient length so as to extend from the rotor into a close association with the inner surface of the housing portion 37 of the comminuting chamber.

In addition, the rotor 96 is provided with a plurality of openings 106 at the depressions between the spaced projections 105. The openings 106 are arranged such that their central axes extend approximately tangential to the longitudinal axis of the drive shaft 30. Where desired, the openings 106 may extend in a radial manner. In this manner, there is provided fluid communication between the comminuting chamber 36 and the vacuum pump 102 via openings 106, cavity 98, radial bore 104 and longitudinal bore 100.

According to the embodiment shown in FIGURE 4, baffle 108 extends from the housing transverse to the hydraulic column above the downstream section of the vacuum rotor 96. Baffle 108 provides a restriction to throat 40, and further facilitates removal of entrapped air from material being comminuted as described below in greater detail. When desired, baffle 108 may be omitted.

Drive shaft 30 has a splined section 112 for cooperating with a complementary centrally disposed splined opening 113 of the knife 56. Stud section 114 is threaded to accommodate internally threaded nut 116 which secures the ejector rotor, spacing disc and knife in position for operation. In this manner, rotation of drive shaft 30 by the drive means effects rotation of the high-speed propelling knife, the spacing disc, the ejector rotor and the spacer.

In order to adjust the axial distance of the knife 56 relative to the perforate valve plates 48, the drive shaft 30 may be selectively moved in an axial direction by means of a suitable gear such as shown in FIGURE 4 of U.S. Patent No. 3,044,514. More specifically, this axial movement is effected by turning an exteriorly disposed handwheel 118 which rotates a worm 119 and in turn rotates the complementary worm gear 120. The worm gear is secured to the bearing cage 33 to rotate and rotation of the worm gear causes the inner bearing cage to rotate. This in turn causes the inner bearing races, which are clamped to the shaft 30, to axially move the shaft 30 and the knife 56 as well as the ejector rotor 81.

Discharge chamber 38 is pivotally mounted so that it can be disengaged from the comminuting chamber to permit access to the comminuting chamber for servicing and cleaning as well as to permit the replacement of a new or modified constructed discharge chamber. As shown in FIGURE 7, the discharge chamber is connected to the swivel yoke 122 by means of pins 124, and the yoke is pivotally mounted at one end at 126 to fixed lug 128 which is secured to the wall of the comminuting chamber 36. The opposite end of swivel yoke 122 is secured to axially adjustable rod 130 by means of a removable clevis pin 132. The opposite end of rod 130 is threaded and passes through threaded bushing 134 which is affixed to a wall of the comminuting chamber. Internally threaded nut members 136 engage the threaded portion of rod 130 and are disposed to each side of bushing 134. Adjustment of rod 130 through bushing 134 adjusts the relative position of the rod, and nut members 136 lock the rod in place, thereby providing proper alignment between the discharge chamber and the comminuting chamber for effecting an air-tight seal.

Upon removal of the clevis pin 132, the swivel yoke 122 may be swung or pivoted from rod 130 since the discharge chamber 38 is connected to the swivel yoke by means of pins 124. This pivotal movement of the swivel yoke causes the discharge chamber to be pivoted completely free of the comminuting chamber.

As explained above, it is important to have an airtight seal or connection between the chambers of the comminuting machine to obviate the ingress of air. A complete air-tight seal between the discharge chamber and the comminuting chamber is accomplished in that there is provided means for effecting the axial translation of the discharge chamber after the discharge chamber is in a closed position. As shown in FIGURES 3, 4 and 7, there is provided threaded locking bolt member 138 for threadedly engaging internally threaded bushing 140 which is mounted against rotation in yoke 122. The locking bolt member extends into the wall of discharge chamber 38 and terminates in cavity 142. This end of the locking bolt member 138 is nonthreaded and washer 144 is mounted thereon. The opposite end of the locking bolt member is provided with a handle, crank or wheel 146.

After the discharge chamber 38 is engaged with the comminuting chamber 36 and the swivel yoke 122 locked in place, the air-tight seal between the two chambers may be effected by means of the locking bolt member 138. To accomplish this, the crank 146 is rotated to axially translate the locking bolt member 138 against the wall of the discharge chamber. This in turn advances the discharge chamber on pins 124 into air-tight engagement with sealing gasket 148 that is positioned in a channel in a marginal end wall of the comminuting chamber. When it is desired to disengage the discharge chamber 38, the crank 146 is rotated in the opposite direction thereby axially translating the locking bolt member and washer 144 engages wall 150 of cavity 142, and as the crank 138 is further rotated the discharge chamber slides back on pins 124 to break the seal between the two chambers. The swivel yoke 122 is then pivotally displaced, as explained above.

Disengagement of the discharge chamber from the comminuting chamber affords ready and complete access to parts of the machine retained within the discharge chamber and the comminuting chamber. This facilitates assembling and disassembling the machine, displacement of the parts and cleaning of the machine and its parts. In addition, it provides means for displacing one type of discharge chamber with another type. For example, discharge chamber 38 may be replaced with a discharge chamber that employs no ejector rotor.

Referring now to the operation of the comminuting machine, the material to be comminuted or emulsified, such as meat, is fed into the reservoir or hopper chamber 34, through the neck or throat 40 of the comminuting chamber 36 to the high speed rotary propelling knife 56. When the material reaches the spaced projections 105 of rotor 96, which acts substantially as a worm, the material is fed in a conveying direction downstream to the cutting knife and through the perforate valve plate 48. The ejector rotor 81 produces suction on the material being comminuted and propels the uniformly distributed material from the perforate plate to and through the discharge port 44 and then through the discharge horn or nozzle 46.

The vacuum rotor 96 rotates at a high speed and centrifugal forces urges the material radially outward against the wall means of the housing of the comminuting chamber including baffle 108. As a consequence, air occluded or entrapped in the material is squeezed out due to the compression, resulting from the centrifugal force, against the wall means. The centrifugal force creates a pocket adjacent the outer wall of rotor 96, substantially free of material undergoing comminution, whereby the air is drawn through openings 106. The air is aspirated by the vacuum means, typically operated at a vacuum of about 10 to 28 inches of mercury, via the openings 106 of the rotor 96, the radial bore 104, and the longitudinal bore 100 in shaft 30.

The foregoing detailed description has been given for clearness of understanding only, and no unnecessary limitations should be understood therefrom, as modifications will be obvious to those skilled in the art.

What is claimed is:

1. An apparatus suitable for comminuting and deaerating food material comprising in advancing sequence a reservoir chamber with inlet means for feeding said material, a deaerating chamber, a comminuting chamber having a wall means opening to said deaerating chamber and being sealed during operation to prevent ingress of air, and a discharge chamber having outlet means for discharging the resulting comminuted material; drive means having a drive shaft extending from said drive means into said deaerating and comminuting chambers; cutter means arranged in said comminuting chamber and operatively connected with said drive shaft for comminuting said material; a longitudinal bore in said drive shaft; suction means communicating with said longitudinal bore; a rotor having a cavity therein mounted within said deaerating chamber on said drive shaft and operatively connected therewith; means for establishing fluid communication between said longitudinal bore in said drive shaft and said cavity; said rotor having spaced, involute projections extending outwardly therefrom and a plurality of openings in said rotor disposed between said spaced projections for establishing fluid communication between said deaerating chamber and said cavity, whereby rotation of said rotor urges said food material radially outward and said material is deaerated by drawing air therefrom through said openings to said suction means.

2. Apparatus according to claim 1 wherein said rotor is tapered in a downstream direction and said spaced projections extend from said rotor into close association with an inner surface of deaerating chamber.

3. Apparatus according to claim 1 including a baffle arranged between said deaerating chamber and said comminuting chamber downstream of said rotor, thereby providing a restricted throat between said deaerating chamber and said comminuating chamber.

4. An apparatus suitable for comminuting and deaerating food material comprising in advancing sequence a reservoir chamber with inlet means for feeding said material, a deaerating chamber, a comminuating chamber having a wall means opening to said deaerating chamber and being sealed during operation to prevent ingress of air, and a discharge chamber having outlet means for discharging the resulting comminuted material; drive means having a drive shaft extending from said drive means into said deaerating and comminuting chambers; cutter means arranged in said comminuating chamber and operatively connected with said drive shaft for comminuting said material; a longitudinal bore in said drive shaft; suction means communicating with said longitudinal bore; a rotor having a cavity therein mounted within said deaerating chamber on said drive shaft and operatively connected therewith; a radial bore in said drive shaft for establishing fluid communication between said longitudinal bore and said cavity; a baffle arranged between said deaerating chamber and said comminuting chamber downstream of said rotor to provide a restricted throat between said deaerating and comminuting chambers; said rotor having spaced, involute projections extending outwardly therefrom and a plurality of openings in said rotor disposed between said spaced projections for establishing fluid communication between said deareating chamber and said cavity, said rotor being tapered in a downstream direction and said projections extending into close association with an inner surface of said deaerating chamber, whereby rotation of said rotor urges said food material radially outward and said material is deaerated by drawing air therefrom through said openings to said suction means.

References Cited
UNITED STATES PATENTS

| | | | |
|---|---|---|---|
| 2,754,750 | 7/1956 | Borrow | 146—188 X |
| 3,034,421 | 5/1962 | Pence | 146—189 X |
| 3,108,626 | 10/1963 | Schmook et al. | 146—192 |
| 3,289,720 | 12/1966 | Otto | 146—182 |

W. GRAYDON ABERCROMBIE, *Primary Examiner.*